United States Patent Office 3,642,738
Patented Feb. 15, 1972

3,642,738
PROCESS FOR THE CONTINUOUS BULK POLYMERIZATION OF VINYL CHLORIDE AT LOW TEMPERATURE
Luigi Patron and Alberto Moretti, Venice, and Gian Paolo Sinatora, Mestre, Venice, Italy, assignors to Chatillon Societa Anonima Italiana per le Fibre Tessili Artificiali S.p.A., Milan, Italy
Filed Oct. 14, 1969, Ser. No. 866,241
Claims priority, application Italy, Oct. 17, 1968, 22,600/68
Int. Cl. C08f 1/04, 1/61, 3/30
U.S. Cl. 260—85.5
9 Claims

ABSTRACT OF THE DISCLOSURE

A process is disclosed for the continuous low-temperature bulk polymerization of vinyl chloride with conversions greater than 18%, in the presence of a catalyst system consisting either of (1) an organic hydroperoxide, sulphur dioxide and an alcoholate of a metal of the first or second group of the Periodic System or of aluminum or (2) an organic hydroperoxide activated by an alcoholic solution of sulphur dioxide and of at least one oxide or hydroxide of an alkaline metal or of magnesium or of magnesium sulphite, the improved features residing in:
  (a) pre-charging the reactor with vinyl chloride to at least ⅓ of its useful holding capacity;
  (b) starting the polymerization with one of the above-described catalysts until a degree of conversion of at least 10% is attained in the presence of a mercapto-compound having a maximum of 4 carbon atoms, which compound is fed to the reaction medium in a concentration of at least 1.3 times that provided in steady conditions of polymerization;
  (c) maintaining during the starting phase of the polymerization a conversion increase below 2.5%/hr. and a viscosity of the polymer obtained below 1.5 dl./g.; and
  (d) carrying on the polymerization in a continuous way according to the predetermined formulation for the steady conditions, with a quantity of mercapto-compound of at least $1.5 \cdot 10^{-3}$ moles/kg. of monomer.

---

Figure 1:
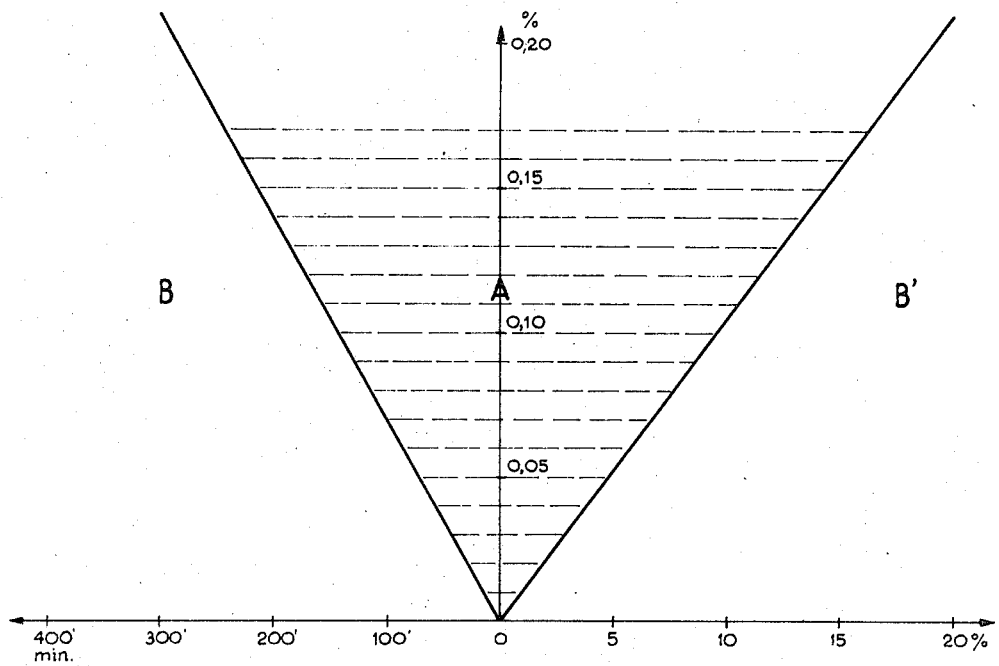

The present invention relates to an improved process for the continuous bulk polymerization of vinyl chloride at low temperature. More particularly, the invention relates to an improved process for the continuous bulk polymerization at low temperature of vinyl chloride with a catalytic system consisting either of (1) an organic hydroperoxide, sulphur dioxide and an alcoholate of a metal of the first or second group of the Periodic System or of aluminum, or (2) an organic hydroperoxide activated by an alcoholic solution of sulphur dioxide and of at least one oxide or hydroxide of an alkaline metal or of magnesium or of magnesium sulphite, the process resulting in a high polymerization conversion.

It has already been suggested that highly syndiotactic polymers of vinyl chloride can be obtained by bulk-polymerizing vinyl chloride at a low temperature in the presence of a catalyst system formed either by an organic hydroperoxide, sulphur dioxide and an alcoholate of a metal of the first or second group of the Periodic System or of aluminum, or by an organic hydroperoxide activated by an alcoholic solution of sulphur dioxide and of at least one oxide or hydroxide of an alkaline metal or of magnesium or magnesium sulphite.

However, such a bulk polymerization of vinyl chloride, just as any other bulk polymerization, has certain limitations with regard to the maximum conversion attainable under conditions of fluidity of the reaction medium. These limitations are mostly due to the fact that the reaction is exothermic and that therefore it is necessary to provide suitable effective means for continuously and regularly eliminating the calories that are freed during the reaction thereby conferring uniform properties on the resulting polymer products.

As is well known, the condition necessary for dissipating the heat of reaction during bulk polymerization, even in reactors of great volume, is that of maintaining the viscosity of the polymerization medium very low.

In the case of bulk polymerization of vinyl chloride at low temperature, it was found that the polymerization mass during the polymerization itself very rapidly reaches a thickened state due to the adsorbtion of the monomer on the polymer. Generally, this thickening of the polymerization mass occurs when only 10–12% of the monomer is polymerized.

This state of the polymerization medium is not very suitable for the regular and continuous elimination of the calories freed during the reaction through the walls of the autoclave, on which walls a crust of polymer is deposited which is difficult to remove and which in turn reduces even more the heat exchange. Where the polymerization is conducted in a continuous manner, as in accordance with the present invention, the thickening of the polymerization medium makes it difficult to disperse the catalyst within the reaction mass.

Thus, the possibility of achieving higher conversion values depends essentially on the adsorbing power of the polymer and therefore on the granular structure of the polymer and on its apparent density.

It has been discovered that in the continuous bulk polymerization of vinyl chloride at low temperature with the above cited catalyst system, it is possible to attain high conversions if low contact times are used for the monomer in contact with the catalyst in the polymerization mass and by using a high concentration of the catalyst system; that is, for instance, in the case of cumene hydroperoxide, at least 1 gram of catalyst for each 100 g. of polymer.

These particular conditions may be reduced from the graph shown in FIG. 1 of the accompanying drawing, depicting data which have been experimentally determined by the applicants. On the ordinate axis of this graph is shown the concentrations of the organic hydroperoxide (in the particular case of the cumene hydroperoxide) as a function of both the maximum conversions (on the axis of the abscissa towards the right) as well as of the maximum dwell times (on the axis of the abscissa towards the left) achievable under satisfactory conditions of fluidity of the polymerization medium.

The polymerizations of the vinyl chloride were conducted in a continuous way in bulk and at a temperature of —30° C., with a molar ratio $SO_2$/cumene hydroperoxide of 2.5 and a molar ratio $SO_2$/magnesium alcoholate of 2. On said graph, A indicates the region in which the reaction medium is fluid and B and B' indicate the regions within which the reaction medium is thickened. As can be seen from the graph, in order to obtain, for instance, a 10% conversion, under satisfactory conditions of fluidity of the reaction medium, it is necessary to operate with at least 0.1% of cumene hydroperoxide and with a dwell time not greater than 150 minutes. The polymers thus obtained, however, are not completely satisfactory, especially where they are to be used in the preparation of fibers.

As a matter of fact, these polymers have little thermal stability inasmuch as they show a high de-hydrochlorination rate [greater than $0.15 \cdot 10^{-3}$ moles of HCl/g. hr. at 180° C., determined according to W. C. Geddes, Europ. Polym. J. 3, 267 (1967)], this being mainly due to the high content of residual catalyst and decomposition products of the catalyst present in the polymer.

On the other hand, the purification of such polymers is in practice difficult and expensive since they are not wetted by water and because the impurities are only slightly soluble in water.

Furthermore, the polymerization conditions mentioned above are not economically convenient because of the high consumption of catalyst. Another disadvantage, verified experimentally, is that in the above cited polymerization conditions there occur high polymerization speeds that cause difficulties in heat exchange, especially in the low-temperature polymerizations.

An object of the present invention is then to provide a method for the continuous bulk polymerization of vinyl chloride at low temperature which will ensure high polymerization conversions, greater than 18%, with low catalytic formulations and with the production of polymers having a high thermal stability, that is, a low de-hydrochlorination speed, such as are suited for being advantageously used for obtaining fibers.

It has now, surprisingly, been discovered in accordance with the present invention that this and other objects may be attained by:

(a) Pre-charging the reactor with vinyl chloride to at least ⅓ of its useful holding capacity;

(b) Starting the low-temperature bulk polymerization with one of the above-indicated catalyst systems until a conversion degree of at least 10% is reached, in the presence of a mercapto-compound having at most 4 carbon atoms, which is fed to the reaction medium in a concentration of at least 1.3 times that provided in the steady state conditions of polymerization;

(c) Maintaining during that starting phase an increase of conversion below 2.5%/hr. and a viscosity of the polymer obtained below 1.5 dl./g.; and (d) Carrying on the polymerization in a continuous way according to the formulation provided in the steady state conditions with a quantity of mercapto-compound which is at least $1.5 \cdot 10^{-3}$ moles/kg. of monomer.

Tests carried out in connection with the present invention have actually established the fact that the starting conditions of the polymerization essentially condition or predetermine the structure of the polymer granule and the apparent density of the polymer and therefore the quantity of monomer adsorbed on it, and that the above-indicated starting conditions are essential for attaining high conversions during the low-temperature bulk polymerization of vinyl chloride.

Under these particular conditions, as a matter of fact, the apparent density of the polymer turns out to be greater than 0.3 g./cc. and in some cases even greater than 0.5 g./cc.

Figure 2:
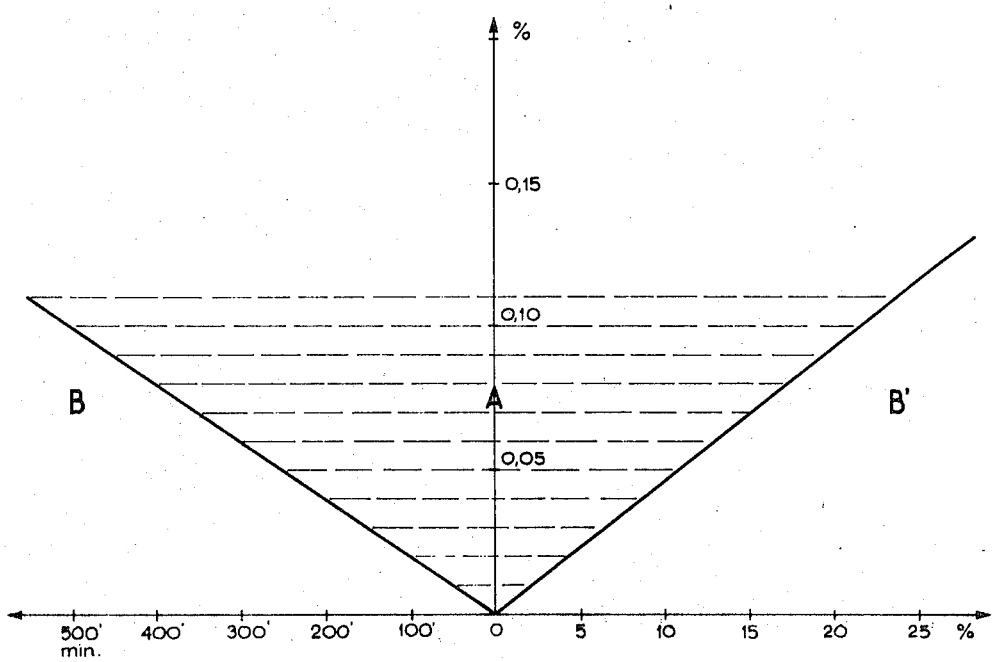

The graph shown in FIG. 2 of the accompanying drawing shows the concentration of the organic hydroperoxide (in the particular case of cumene hydroperoxide) on the axis of the ordinates as a function both of the conversion (on the axis of the abscissa towards the right) as well as of the maximum dwell time (on the axis of the abscissa towards the left) achievable under satisfactory conditions of fluidity of the polymerization medium.

The polymerizations were conducted in the same manner as those represented by the graph of FIG. 1, with the difference that here in FIG. 2 they were started according to that which is described above.

As can be seen by comparing the graph of FIG. 1 with the graph of FIG. 2, for the same value of concentration of the cumene hydroperoxide greater conversions may be attained by using longer dwell times under satisfactory conditions of fluidity of the reaction medium.

The pre-charging of the reactor is made to at least ⅓ of its volume or holding capacity in order to allow from the very start of the polymerization a good thermal exchange and an effective stirring of the reaction medium. In practice, the best conditions for polymerization are attained when the pre-charge is carried out at a value between ⅓ and ⅔ of the useful volume of the reactor.

As indicated above, one of the indispensable conditions that must be observed in the continuous low-temperature bulk polymerization of vinyl chloride (started with one of the above indicated catalyst systems) in order to obtain high conversion values. is in the use of particular mercapto-compounds and in the quantity with which these mercapto-compounds are fed into the reaction system.

Tests carried out in connection with the present invention have established in fact that only by using mercapto-compounds containing at most 4 carbon atoms and by feeding them during the starting phase of the polymerization in quantities of at least 1.3 times that provided in steady conditions of polymerization, are there obtained high polymerization conversions under conditions of permanent fluidity of the reaction medium.

The mercapto-compounds having at most 4 carbon atoms which may be used in the process of this invention are for instance: n-butyl-mercaptan, n-propyl-mercaptan, 2-mercapto-ethanol, 3-mercapto-propanol, alpha-mercapto-acetic acid, alpha-mercapto-acetate of methyl or of ethyl, etc.

Against the mercapto-compounds of at most 4 carbon atoms, those having a boiling point greater than 100° C. are practically the preferred ones, and in particularly in cases where it is desired to carry out the cooling of the reaction mass by means of evaporation of the monomer inside the reactor, i.e., with internal cooling.

In practice, the best results are obtained when the quantity of mercapto-compound fed during the starting phase of the polymerization is between 1.5 and 2 times that provided in steady conditions. It is of course also possible to operate with greater quantities but without any further practical advantage but only with a waste of mercapto-compound and therefore with a corresponding increase in the cost of the process.

The following Table I makes evident how by operating outside the above-indicated conditions, there will be a thickening of the reaction mass and consequently an uncontrolled polymerization.

The conditions under which the polymerizations shown in the table were conducted are the following: The polymerization reactor had a holding capacity of 5700 cc. and was pre-charged with 2850 g. of vinyl chloride. The temperature of polymerization was −30° C.

TABLE I

Starting conditions

| Test Number | Mercapto-compound Type | Quantity fed in g./hr. | Vinyl chloride fed in g./hr. | Cumene hydroperoxide fed in g./hr. | Methanolic solution of $SO_2$ and $Mg(CH_3O)_2$ fed in g./hr.[1] | Conversion, percent | Duration in hours | Intrinsic viscosity in dl./g.[2] |
|---|---|---|---|---|---|---|---|---|
| 1 | 2-mercapto-ethanol | 0.071 | 285 | 0.285 | 2.24 | 13 | 10 | 1.8 |
| 2 | do | 0.107 | 285 | 0.285 | 2.24 | 12.8 | 10 | 1.15 |
| 3 | do | 0.107 | 285 | 0.285 | 2.24 | 12.6 | 10 | 1.20 |
| 4 | do | 0.107 | 570 | 0.285 | 2.24 | 5.6 | 5 | 1.05 |
| 5 | n-Butylmercaptan | 0.16 | 356 | 0.356 | 2.8 | 11.5 | 8 | 1.18 |
| 6 | n-Dodecyl mercaptan | 0.285 | 285 | 0.285 | 2.24 | ~12 | 10 | 1.40 |

TABLE I—Continued

| Test Number | Fed mercapto compound in g./hr. | Fed vinyl chloride in g./hr. | Fed cumene hydroperoxide in g./hr. | Steady conditions Methanolic solution of $SO_2$ and $Mg(CH_3O)_2$ fed in g./hr. | Conversion, percent | Intrinsic viscosity dl/g.[2] | Apparent density in g./cc.[1] | Remarks |
|---|---|---|---|---|---|---|---|---|
| 1 | 0.071 | 570 | 0.285 | 2.24 | | | | Uncontrolled polymerization due to thickening of reaction mass during starting phase. |
| 2 | 0.071 | 570 | 0.285 | 2.24 | 20.7 | 1.39 | 0.51 | Fluid medium. |
| 3 | 0.050 | 570 | 0.285 | 2.24 | ~14 | 1.9 | 0.26 | Polymerization suspended due to thickening of the reaction mass after 15 hours from start. |
| 4 | 0.071 | 570 | 0.285 | 2.24 | ~13 | 1.3 | 0.24 | Polymerization suspended due to thickening after 9 hours from start. |
| 5 | 0.107 | 712 | 0.356 | 2.8 | 18.8 | 1.37 | 0.49 | Fluid medium. |
| 6 | 0.190 | 570 | 0.285 | 2.24 | | | | Polymerization suspended due to thickening of reaction mass during starting phase. |

[1] The methanolic solution has a concentration of 10.7% by weight of $SO_2$ and of 7.47% by weight of $Mg(CH_3O)_2$.
[2] The intrinsic viscosity is measured with a polymer solution of 0.1% in cyclohexane at 30°C.

As can be seen from Table I, the use of a mercapto-compound in a concentration equal to that provided in the steady condition (test 1) or the attainment during the starting phase of a conversion below 10% (test 4) provokes the thickening of the reaction mass, wherefore the subsequent polymerization occurs under uncontrolled conditions. The thickening of the polymerization mass occurs also in the case in which the mercapto-compound is fed during the steady condition of polymerization in quantities of less than $1.5.10^{-3}$ moles/kg. of monomer (test 3). Test 6, on the contrary, concerns the use of a mercapto-compound having more than 4 carbon atoms.

The conversion increase during the starting phase of the polymerization, as well as during the passage from the starting to the steady conditions, is another factor which must be taken into consideration in the continuous low-temperature bulk polymerization of vinyl chloride.

From tests carried out in connection with the present invention it appears that the conversion increase must be less than 2.5%/hr. and must preferably be between 1 and 2%/hr.

The organic hydroperoxide used as one of the components of the catalyst system of this invention is an organic compound of the general formula: R—O—O—H, wherein R may be a linear or branched alkyl radical, a cycloalkyl or an aryl-alkyl radical.

Examples of such organic compounds are: methyl-, ethyl-, n-propyl-, tert.-butyl-, n-butyl-, amyl-, hexyl-, octyl-, etc., hydroperoxide, ethyl-benzyl-hydroperoxide, iso-butyl-hydroperoxide, phenyl-isopropyl-hydroperoxide, etc. Particularly advantageous results are achieved by using cumene hydroperoxide and tert.-butyl-hydroperoxide.

The concentration of the organic hydroperoxide is not critical and in general may be varied from 0.01% to 3% by weight with respect to the monomer. The process of this invention, however, allows one to use very small concentrations of hydroperoxide, concentrations in general not exceeding 0.2% by weight with respect to the monomer.

The sulphur dioxide is used in such quantities as to have the molar ratio sulphur dioxide/organic hydroperoxide between 0.5 and 10, and preferably between 1 and 3.

In the case in which as a third component of the catalyst system there is used an alcoholate of a metal of the first or second group of the Periodic System, the molar ratio (R—O—)/$SO_2$, the (R—O—) being the alkoxy moiety of the alcoholate wherein R indicates a linear or branched alkyl radical having from 1 to 6 carbon atoms, is preferably between 0.85 and 1.5.

However, in the case in which on the contrary as a third component there is used an oxide or hydroxide of an alkaline metal or of magnesium or magnesium sulphite, the ratio $SO_2$/Me, $SO_2$ being expressed in grammoles/lt. and Me being the concentration of the metal in gram-equivalents/liter, is preferably between 0.8 and 1.

The process of the present invention allows one to attain high polymerization conversions (greater than 18%) in the continuous low-temperature bulk polymerization of vinyl chloride, by using low catalytic formulations and without any thickening of the reaction mass occurring and without incrustations on the walls of the reactor.

By the term "low-temperature polymerization" is meant a polymerization conducted at a temperature below 0° C. and more particularly between −10° C. and −70° C.

It is to be understood that the process of this invention may also be applied with advantage to the preparation of vinyl chloride copolymers containing up to 50% by weight of at least one other ethylenically unsaturated monomer copolymerizable with vinyl chloride. The term "monomer" as used herein is therefore to be regarded as referring for convenience to vinyl chloride whether alone or with such other ethylenically unsaturated monomers copolymerizable with vinyl chloride.

By the term "ethylenically unsaturated monomer" is meant an organic compound containing the group C=C.

Examples of such compounds are: vinyl or vinylidene compounds such as vinylidene fluoride or chloride, vinyl fluoride, vinyl esters of aliphatic carboxylic acids containing from 2 to 18 carbon atoms, as for instance the vinyl esters of acetic acid, of propionic acid, etc., monomers of the acrylic type, such as acrylic acid, methacrylic acid and their derivatives such as acrylonitrile, acrylates and methacrylates of aliphatic alcohols containing from 1 to 12 carbon atoms, etc.

In order still more clearly to illustrate the inventive idea of this invention and its practical execution, the following specific examples are given without limiting purposes:

EXAMPLE 1

(a) Starting phase of the polymerization

Into a polymerization reactor with a useful holding capacity of 1000 liters, provided with a stirrer, a cooling sleeve, a feeding system, a thermocouple for the control of the temperature and an overflow pipe, were pre-charged 500 kg. of vinyl chloride.

Before the starting, the reactor is repeatedly purged with nitrogen.

Inside the reactor a constant temperature of −30° C. and a constant pressure of 365 mm. of Hg were maintained. For 8 hours there were continuously fed into the reactor:

62.5 kg./hr. of vinyl chloride,
60 g./hr. of tert.-butyl-hydroperoxide,
1000 g./hr. of a methanolic solution having a concentration of 10.5% by weight of sulphur dioxide and of 3.34% by weight of magnesium oxide, and
23.4 g./hr. of 2-mercapto-ethanol.

After 8 hours the polymerization conversion turned out to be 11.7% while the polymer showed an apparent density of 0.37 g./cc. and an intrinsic viscosity of 1.18 dl./g.

(b) Polymerization at steady (running) conditions

After the first 8 hours, during which takes place the starting phase of the polymerization takes place, there were continuously fed into the reactor:

125 kg./hr. of vinyl chloride,
60 g./hr. of tert.-butyl-hydroperoxide,
1000 g./hr. of the above said methanolic solution of $SO_2$ and MgO, having the above indicated concentration, and
15.6 g./hr. of 2-mercapto-ethanol.

Through the overflow pipe the polymeric suspension obtained was discharged into a container maintained at $-30°$ C.

Subsequently the polymeric suspension was centrifuged at $-30°$ C. and from the polymer thus obtained the residual monomer was removed in a plate furnace heated at 60° C., the evaporated monomer being condensed and recycled. The monomer separated by centrifuging was distilled and re-cycled to the polymerization reactor after having been cooled down to $-30°$ C. by means of a heat exchanger.

The output amounted to 25.8 kg./hr. of polymer, corresponding to a conversion rate of 20.6 percent/hr. The polymerization was continued for 30 days without noticing any thickening or any formation of incrustations on the walls of the reactor.

The polymer obtained showed the following characteristics:

Intrinsic viscosity—1.35 dl./g.
Apparent density—0.49 g./cc.
Syndiotactic index [1]—2.13
Glass-transition temperature [2]—102° C.
De-hydrochlorination rate at 180° C.—$0.055 \cdot 10^{-3}$ moles of HCl/g. hr.
Original color:[3]
   Purity index—PI:99.4
   Brightness—B:95.8
Heat stability:[4]
   ΔPI—2.0
   ΔB—10.2

[1] The syndiotactic index was determined as the ratio between the infrared absorption bands $D635$ cm.$^{-1}$ and $D693$ cm.$^{-1}$, as described by Fordham, Burleigh & Sturm in J. Polymer Sci. vol. XLI (1959), pages 73–82.
[2] The glass transition temperature was determined as described in J. Poylm. Sci., vol. 56 (1962), on pages 225–231.
[3] The original color was determined by means of a General Electric Integrating Spectorophotometer, according to the C.I.E system of representation and color measurement. According to this system the color is expressed in terms of purity index (PI) and brightness (B), referred to a standard illumination.
[4] The heat stability is expressed as the variation of the purity index (ΔPI) and by the variation of the brightness (ΔB) of the polymer after heating in a forced air oven at 110° C. for 1 hour.

EXAMPLE 2

(a) Starting phase of the polymerization

Into a polymerization reactor of 1000 liters useful holding capacity, fitted with a stirrer and provided with a feeding system, a thermocouple for the temperature control, an overflow pipe and a cooling coil with ammonia arranged in the upper inside part of the reactor, were preloaded 500 kg. of vinyl chloride.

Before the starting of the polymerization, the reactor was repeatedly purged with nitrogen. Inside the reactor was maintained at a pressure of 360 mm. Hg. At this pressure the boiling temperature of the vinyl chloride was $-30°$ C. and the reaction heat was removed by evaporation of the vinyl chloride itself, which, condensed by the above-cited ammonia cooling coil, falls back into the reactor. In this way there was attained an internal thermostatically stabilized temperature.

The reactor was continuously fed for 10 hours with:

50 kg./hr. of vinyl chloride;
100 g./hr. of cumene hydroperoxide;
800 g./hr. of a methanolic solution having a concentration of 10.5% by weight of $SO_2$ and 7.47% by weight of magnesium methylate, and
23.4 g./hr. of 2-mercapto-ethanol.

After 10 hours the polymerization conversion amounted to 13.5% and the polymer showed an apparent density of 0.39 g./cc. and an intrinsic viscosity of 1.20 dl./g.

(b) Polymerization at steady (running) conditions

After the first 10 hours, during which the starting phase of the polymerization takes place, there were continuously fed into the reactor:

100 kg./hr. of vinyl chloride
100 g./hr. of cumene hydroperoxide
800 g./hr. of the above mentioned methanolic solution of $SO_2$ and magnesium methylate, and
15.6 g./hr. of 2-mercapto-ethanol.

Through the overflow pipe the polymer suspension thus obtained was discharged into a container placed 10 meters below the reactor and there maintained at $-30°$ C. Thereafter the polymeric suspension was centrifuged at $-30°$ C. and from the polymer thus obtained the residual monomer was removed by means of a plate oven heated at 60° C., while the evaporated monomer was condensed and recycled. The monomer separated by centrifuging was distilled and recycled to the polymerization reactor after having been cooled down to $-30°$ C. by means of a heat exchanger.

The output turned out to be 23.2 kg./hr. corresponding to an hourly conversion of 23.2%.

The polymer obtained showed the following properties:

Intrinsic viscosity—1.42 dl./g.
Apparent density—0.51 g./cc.
Index of syndiotacticity—2.11
Glass-transition temperature—102° C.
De-hydrochlorination rate at 180° C.—$0.050 \cdot 10^{-3}$ moles of HCl/g. hr.
Original color:
   Purity index—PI:99.5
Brightness—B:95.7
Heat stability:
   ΔPI—1.9
   ΔB—10.3

What is claimed is:

1. In a process for the continuous low-temperature bulk polymerization of vinyl chloride at a temperature below 0° C. in the presence of a catalyst system comprising either (1) an organic hydroperoxide, sulphur dioxide and an alcoholate of a metal of the first or second group of the Periodic System or of aluminum or (2) an organic hydroperoxide activated by an alcoholic solution of sulphur dioxide and of at least one oxide or hydroxide of an alkaline metal or of magnesium or of magnesium sulphite, the improvement, which ensures conversions greater than 18%, comprising:
   (a) precharging the reactor with vinyl chloride to at least ⅓ of its useful holding capacity;
   (b) starting the polymerization with one of the above-described catalysts until a degree of conversion of at least 10% is attained in the presence of a mercapto-compound having a maximum of 4 carbon atoms, which compound is fed to the reaction medium in a concentration of at least 1.3 times that provided in steady conditions of polymerization;
   (c) maintaining during the start phase of the polymerization a conversion increase below 2.5%/hr. and a viscosity of the polymer obtained below 1.5 dl./g.; and (d) carrying on the polymerization in a continuous way according to the predetermined formulation for the steady conditions, with a quantity of mercapto-compound of at least $1.5 \cdot 10^{-3}$ moles/kg. of monomer.

2. A process according to claim 1, wherein the reactor is pre-charged to from ⅓ to ⅔ of its useful holding capacity.

3. A process according to claim 1 wherein the mercapto-compound has a boiling point greater than 100° C.

4. A process according to claim 1, wherein the mercapto-compound is fed in a concentration between 1.5 and 2 times that provided in steady conditions.

5. A process according to claim 1, wherein the conversion increment is between 1 and 2%/hr.

6. A process according to claim 1, wherein the organic hydroperoxide is fed in a quantity not exceeding 0.2% by weight with respect to the monomer.

7. A process according to claim 1 wherein the molar ratio sulphur dioxide/organic hydroperoxide is between 1 and 3.

8. A process according to claim 1, wherein the vinyl chloride is copolymerized with up to 50% of one or more other ethylenically unsaturated monomers co-polymerizable with it.

9. In a process for the continuous low-temperature bulk polymerization of vinyl chloride at a temperature below 0° C. in the presence of a catalyst system comprising either (1) an organic hydroperoxide, sulphur dioxide and an alcoholate of a metal of the first or second group of the Periodic System or of aluminum wherein the concentration of the organic hydroperoxide is between 0.01% and 3% by weight with respect to the monomer, the molar ratio sulphur dioxide/organic hydroperoxide is between 0.5 and 10, and the molar ratio (R—O—)/SO$_2$, the (R—O—) being the alkoxy moiety of the alcoholate wherein R indicates a linear or branched alkyl radical having from 1 to 6 carbon atoms, is between 0.85 and 1.5, or (2) an organic hydroperoxide activated by an alcoholic solution of sulphur dioxide and of at least one oxide or hydroxide of an alkaline metal or of magnesium or of magnesium sulphite wherein the concentration of the organic hydroperoxide and of SO$_2$ is the same as above in (1) and the ratio SO$_2$/Me is between 0.8 and 1, SO$_2$ being expressed in grammoles/liter and the Me being the concentration of the metal in gram-equivalents/liter, the improvement, which ensures conversions greater than 18%, comprising:

(a) precharging the reactor with vinyl chloride to at least ⅓ of its useful holding capacity;

(b) starting the polymerization with one of the above-described catalysts until a degree of conversion of at least 10% is attained in the presence of a mercapto-compound having a maximum of 4 carbon atoms, which compound is fed to the reaction medium in a concentration of at least 1.3 times that provided in steady conditions of polymerization;

(c) maintaining during the start phase of the polymerization a conversion increase below 2.5%/hr. and a viscosity of the polymer obtained below 1.5 dl./g.; and (d) carrying on the polymerization in a continuous way according to the predetermined formulation for the steady conditions, with a quantity of mercapto-compound of at least $1.5 \cdot 10^{-3}$ moles/kg. of monomer.

References Cited

UNITED STATES PATENTS 3,255,164   6/1966   Visger et al. _____ 260—86.3

JOSEPH L. SCHOFER, Primary Examiner

J. A. DONAHUE, JR., Assistant Examiner

U.S. Cl. X.R.

260—86.3, 87.1, 87.5 A, 87.7, 92.8 R